(12) United States Patent
Yamazaki

(10) Patent No.: US 7,613,886 B2
(45) Date of Patent: Nov. 3, 2009

(54) METHODS AND APPARATUS FOR SYNCHRONIZING DATA ACCESS TO A LOCAL MEMORY IN A MULTI-PROCESSOR SYSTEM

(75) Inventor: Takeshi Yamazaki, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 241 days.

(21) Appl. No.: 11/053,689

(22) Filed: Feb. 8, 2005

(65) Prior Publication Data

US 2006/0179255 A1 Aug. 10, 2006

(51) Int. Cl.
G06F 12/00 (2006.01)
G06F 13/00 (2006.01)
G06F 13/28 (2006.01)
G06F 15/167 (2006.01)
G11C 7/10 (2006.01)
G11C 7/18 (2006.01)

(52) U.S. Cl. .................. 711/147; 711/100; 711/117; 711/119; 711/120; 711/130; 711/131; 711/141; 711/144; 711/148; 711/149; 711/150; 711/156; 711/168; 711/154; 365/189.04; 365/189.19; 709/212; 709/213; 709/214; 709/216

(58) Field of Classification Search .............. None
See application file for complete search history.

(56) References Cited

U.S. PATENT DOCUMENTS

| | | | |
|---|---|---|---|
| 4,891,751 A | 1/1990 | Call | |
| 5,748,539 A * | 5/1998 | Sproull et al. | 365/189.04 |
| 6,038,646 A * | 3/2000 | Sproull | 711/158 |
| 6,108,693 A | 8/2000 | Tamura | |
| 6,247,101 B1 * | 6/2001 | Settles | 711/145 |
| 6,289,434 B1 * | 9/2001 | Roy | 712/32 |
| 6,526,491 B2 * | 2/2003 | Suzuoki et al. | 711/164 |
| 6,601,138 B2 * | 7/2003 | Otterness et al. | 711/114 |
| 6,779,049 B2 * | 8/2004 | Altman et al. | 710/22 |
| 6,970,982 B2 * | 11/2005 | Altman et al. | 711/141 |
| 2002/0138707 A1 * | 9/2002 | Suzuoki et al. | 711/163 |
| 2004/0107264 A1 | 6/2004 | Nishida | |

FOREIGN PATENT DOCUMENTS

| | | |
|---|---|---|
| EP | 1209573 A | 5/2002 |
| JP | 07-134698 | 5/1995 |
| JP | 2002-342165 | 11/2002 |

OTHER PUBLICATIONS

International Search Report and Written Opinion for Corresponding International Application PCT/JP2006/302581.
Office Action for corresponding Japanese Patent Application 2006-029780 dated Mar. 3, 3009.

* cited by examiner

*Primary Examiner*—Tuan V Thai
*Assistant Examiner*—Marwan Ayash
(74) *Attorney, Agent, or Firm*—Matthew B. Dernier, Esq.; Gibson & Dernier LLP

(57) ABSTRACT

Methods and apparatus provide for receiving a request from an initiating device to initiate a data transfer into a local memory for execution of one or more programs therein, the local memory being operatively coupled to a first of a plurality of parallel processors capable of operative communication with a shared memory; facilitating the data transfer into the local memory; and producing a synchronization signal indicating that the data transfer into the local memory has been completed.

49 Claims, 10 Drawing Sheets

METHODS AND APPARATUS FOR SYNCHRONIZING DATA ACCESS TO A LOCAL MEMORY IN A MULTI-PROCESSOR SYSTEM

BACKGROUND

The present invention relates to methods and apparatus for synchronizing data accesses to a local memory in a multi-processor system.

Real-time, multimedia applications are becoming increasingly important. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results.

SUMMARY OF THE INVENTION

In a broadband engine (BE) multi-processor system, a main processor (PU) and a plurality of sub-processors (SPUs) share a common system memory. Each SPU has a local memory in which to execute instructions and a processor interface circuit in which there is more than one functional data transfer path into the local memory. A data write to a given memory location in the local memory of an SPU followed by a data read to the same location through the same function al path can be synchronized to ensure that the new data are written before the data are read. Such synchronization has not previously been possible, however, when a data write to the local memory of the SPU through one functional path is followed by the initiation of a data read to the same location through another functional path (e.g., by notification to the SPU by the PU). Indeed, depending upon latencies in the system, old data at the location in local memory may be read before the new data are written.

In accordance with one embodiment of the invention, the SPUs are capable of controlling synchronization when a data write to the local memory of the SPU through one of the functional paths is followed by a data read to the same location that is initiated through another functional path. In response to the notification of a data write (e.g., by the PU), the SPU issues a recover synch command that writes to the SPU channel interface. This causes a tracking of the data transfer and a change in the channel count when the data write is visible to the SPU. The SPU will wait until the channel count is reset prior to reading the data from the local memory location.

In accordance with another embodiment of the invention, the PU is capable of controlling synchronization when a data write to the local memory of the SPU through one functional path is followed by a data transfer from the same location to the shared memory through another functional path. For example, an I/O device may notify the PU via interrupt of the initiation of a data write to the location in local memory. In response, the PU may issue a recover synch command to a special purpose register of the SPU. This register is accessible by the processor interface to start tracking the data transfer and to set the value of the register to a specific value (e.g., zero) when the data write is visible to the DTE. The PU may wait until the register value is zero prior to issuing a data transfer command to transfer the data from the local memory location to the shared memory.

In accordance with one or more features described herein, an apparatus includes: a plurality of parallel processors capable of operative communication with a shared memory; a local memory operatively coupled to a first of the processors such that data may be transferred between the shared memory and the local memory for execution of one or more programs therein; and a processor interface circuit coupled to the first processor and the local memory thereof and operable to separately: (i) facilitate data transfers into and out of the local memory, and (ii) facilitate communication between the other processors and the first processor. The processor interface circuit is operable to produce a synchronization signal indicating that a data transfer into the local memory has been completed.

The first processor is preferably operable to read the transferred data from the local memory in response to the synchronization signal. Alternatively, the first processor may initiate a transfer of the transferred data from the local memory to the shared memory in response to the synchronization signal.

The processor interface circuit may produce the synchronization signal in response to: (i) a recover synchronization request by the first processor, and (ii) completion of the data transfer into the local memory. By way of example, processor interface circuit may include a channel interface circuit operable to change a processor readable value in response to a processor writable instruction; and the recover synchronization request may be issued by the first processor by writing a synchronization instruction to the channel interface circuit such that the processor readable value indicates that the synchronization request has been made.

The processor interface circuit may be operable to produce the synchronization signal by writing a synchronization instruction to the channel interface circuit such that the processor readable value indicates that the data transfer into the local memory has been completed. The processor interface circuit may include a memory interface circuit operable to facilitate the data transfers into and out of the local memory; and the memory interface circuit may be operable to at least initiate the production of the synchronization signal by monitoring when the data transfer into the local memory has been completed.

The first processor is preferably operable to receive the synchronization signal by issuing a read instruction to the channel interface circuit and in response obtaining the processor readable value indicating that the data transfer into the local memory has been completed. The first processor may be operable to at least one of: (i) read the transferred data from the local memory, and (ii) initiate a transfer of the transferred data from the local memory to the shared memory, each in response to the synchronization signal.

The first processor is preferably operable to issue a recover synchronization request for the synchronization signal to the processor interface circuit in response to a notification signal issued by a second one of the processors indicating that the data transfer to the local memory has been initiated.

The second processor may initiate the data transfer into the local memory. Alternatively, a device other than the other parallel processors may initiate the data transfer into the local memory.

In accordance with one or more further embodiments, the processor interface circuit may be operable to produce a synchronization signal indicating that a data transfer into the local memory has been completed in response to: (i) a recover synchronization request by a second one of the processors, and (ii) completion of the data transfer into the local memory. In such embodiments, the first processor is preferably operable to at least one of: (i) read the transferred data from the local memory, and (ii) initiate a transfer of the transferred data from the local memory to the shared memory, each in response to a notification signal from the second processor indicating that the data transfer to the local memory has been completed.

In accordance with one or more further embodiments, the first or second processors may be operable to issue the recover synchronization request in response to initiation of the data transfer to the local memory by an external device in operative communication with the apparatus through a communication network.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
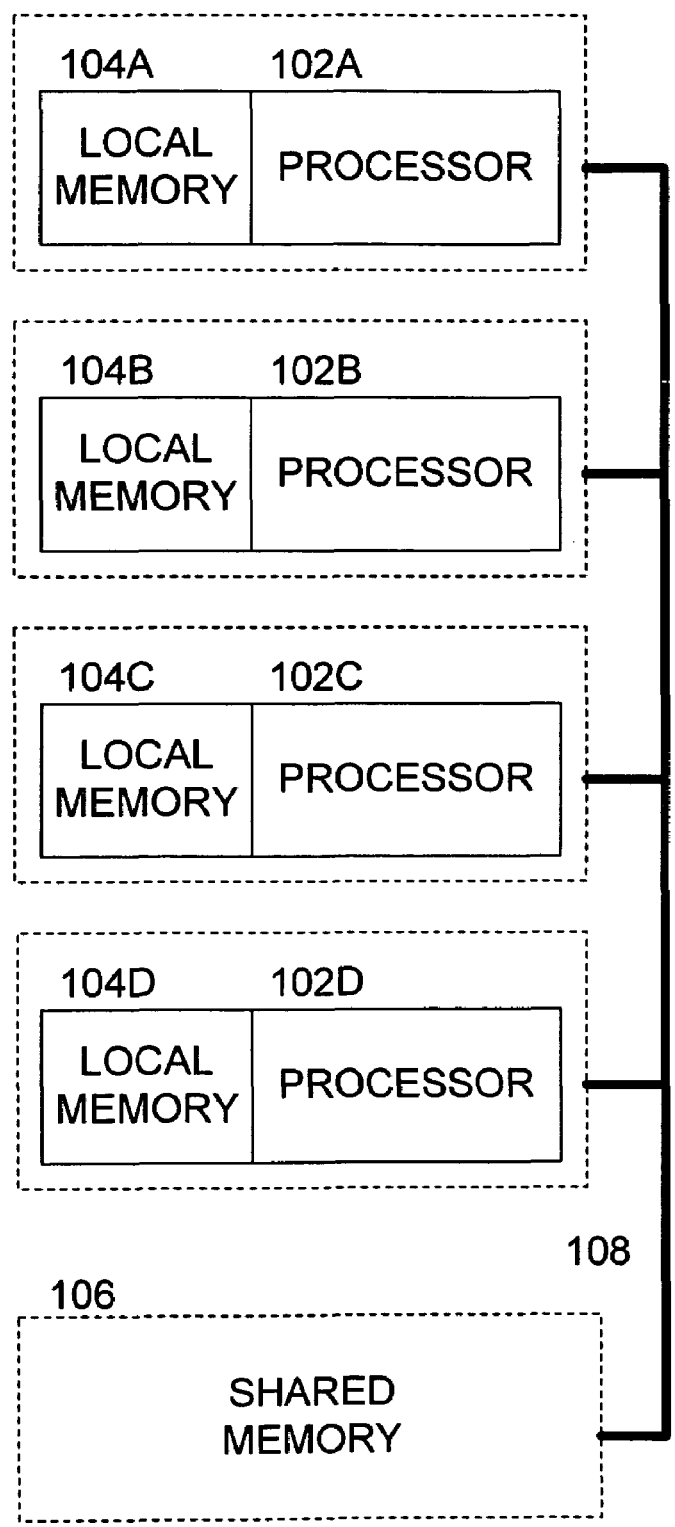
FIG. 1 is a block diagram illustrating the structure of a multi-processing system having two or more sub-processors accordance with one or more aspects of the present invention.

With reference to the drawings, wherein like numerals indicate like elements, there is shown in FIG. 1 a processing system 100 suitable for implementing one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The multi-processing system 100 includes a plurality of processors 102A-D, associated local memories 104A-D, and a shared memory 106 interconnected by way of a bus 108. The shared memory may also be referred to herein as a main memory or system memory. Although four processors 102 are illustrated by way of example, any number may be utilized without departing from the spirit and scope of the present invention.

Each of the processors 102 may be of similar construction or of differing construction. The processors 102 may be implemented utilizing any of the known technologies that are capable of requesting data from the system memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

One of the processors 102 of the system 100 may take on the role as a main (or managing) processor. The main processor may schedule and orchestrate the processing of data by the other processors 102. Examples of the functionality of the main processor will be discussed in more detail hereinbelow.

Figure 2:
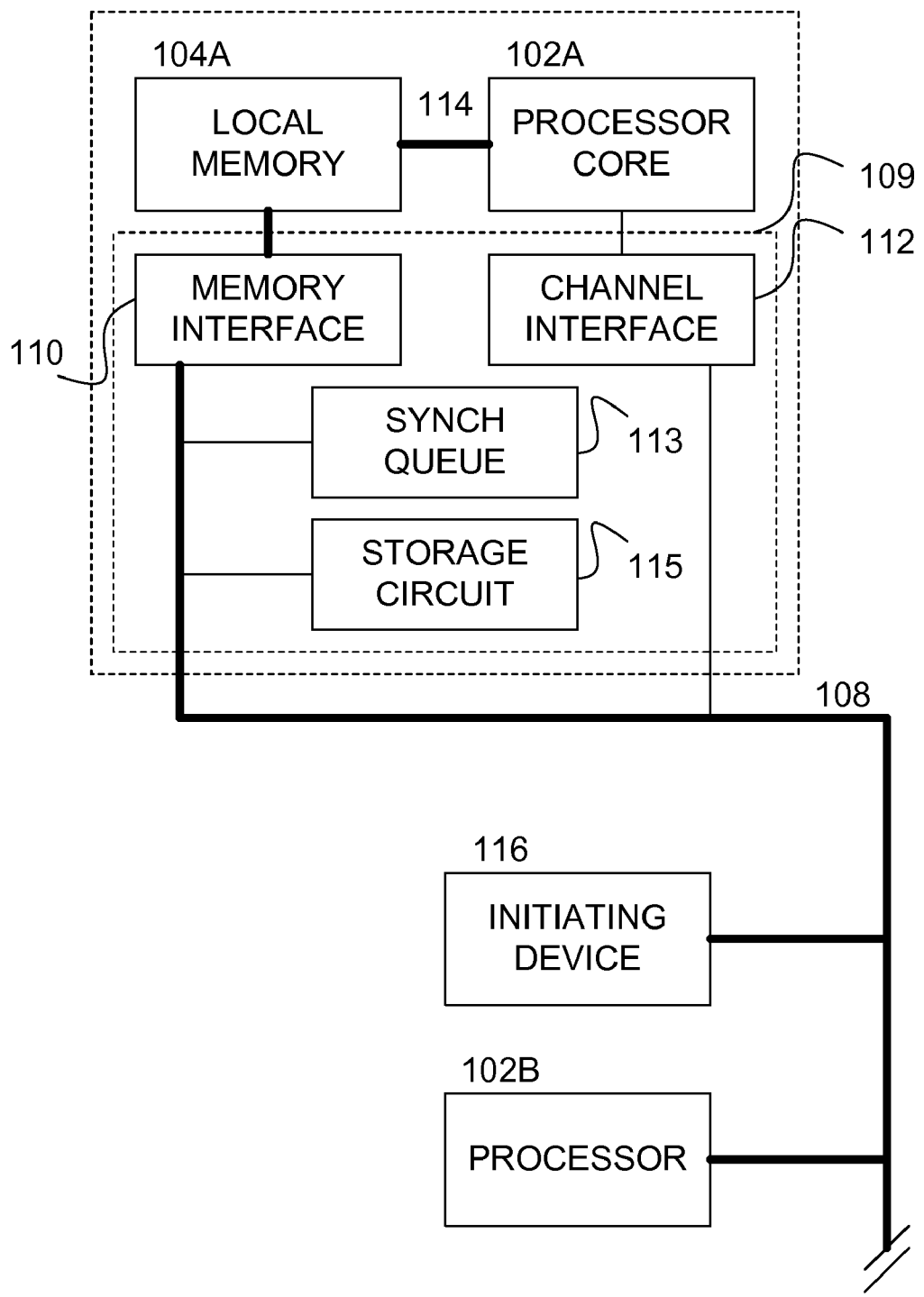
FIG. 2 is a block diagram illustrating further details of one or more of the processors of the processing system of FIG. 1.

Reference is now made to FIG. 2, which illustrates further details concerning one or more of the processors 102 of the system 100. Each processor 102 preferably includes a processor core 102A, a local memory 104A, and a processor interface circuit 109, which may be integrally disposed on a common semi-conductor substrate or may be separately disposed as may be desired by a designer.

The processor core 102A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core 102A may include an instruction buffer, instruction decode circuitry, dependency check circuitry, instruction issue circuitry, and execution stages.

The local memory 104A is coupled to the processor core 102A via a bus 114. The local memory 104A is preferably located on the same chip (same semiconductor substrate) as the processor core 102A; however, the local memory 104A is preferably not a traditional hardware cache memory in that there are no on-chip or off-chip hardware cache circuits, cache registers, cache memory controllers, etc. to implement a hardware cache memory function. As on chip space is often limited, the size of the local memory 104A may be much smaller than the system memory 106.

The processors 102 preferably provide data access requests to copy data (which may include program data) from the system memory 106 over the bus 108 into their respective local memories 104 for program execution and data manipulation. The mechanism for facilitating data access may be implemented utilizing any of the known techniques, one of which (a direct memory access (DMA) technique) will be discussed below.

The processor interface circuit 109 preferably includes a memory interface circuit 110 and a channel interface circuit 112. The memory interface circuit is preferably operable to facilitate data transfers into and out of the local memory 104A. For example, the memory interface circuit 110 may be operable to perform direct memory access (DMA) techniques to transfer blocks of data into and out of the local memory 104A. Such data transfers may take place between the shared memory 106 and the local memory 104A, between another one of the processors (such as processor 102B) and the local memory 104A, and/or between some other initiating device 116. It is noted that the initiating device 116 may be an input/output device within the system 100, and external device that may be coupled to the system 100 over a communications network, etc. In this regard, it is noted that the system 100 may be coupled to other processing systems via known network interfacing techniques such that data may be shared between the system 100 and such other processing devices in order to achieve a distributed computing system.

The channel interface circuit 112 is preferably operable to facilitate communication between the processor 102A and the other processors, such as processor 102B, 102C, and 102D. While the respective functions of the memory interface 110 and the channel interface 112 are of significant utility, they may present unique challenges in managing the transfer of data into the local memory 104A and subsequent access of such data by the processor core 102A, other devices of the system 100, or devices of a larger distributed computing system. These aspects of the system 100 will be discussed in more detail with respect to FIGS. 3-6.

Figure 3:
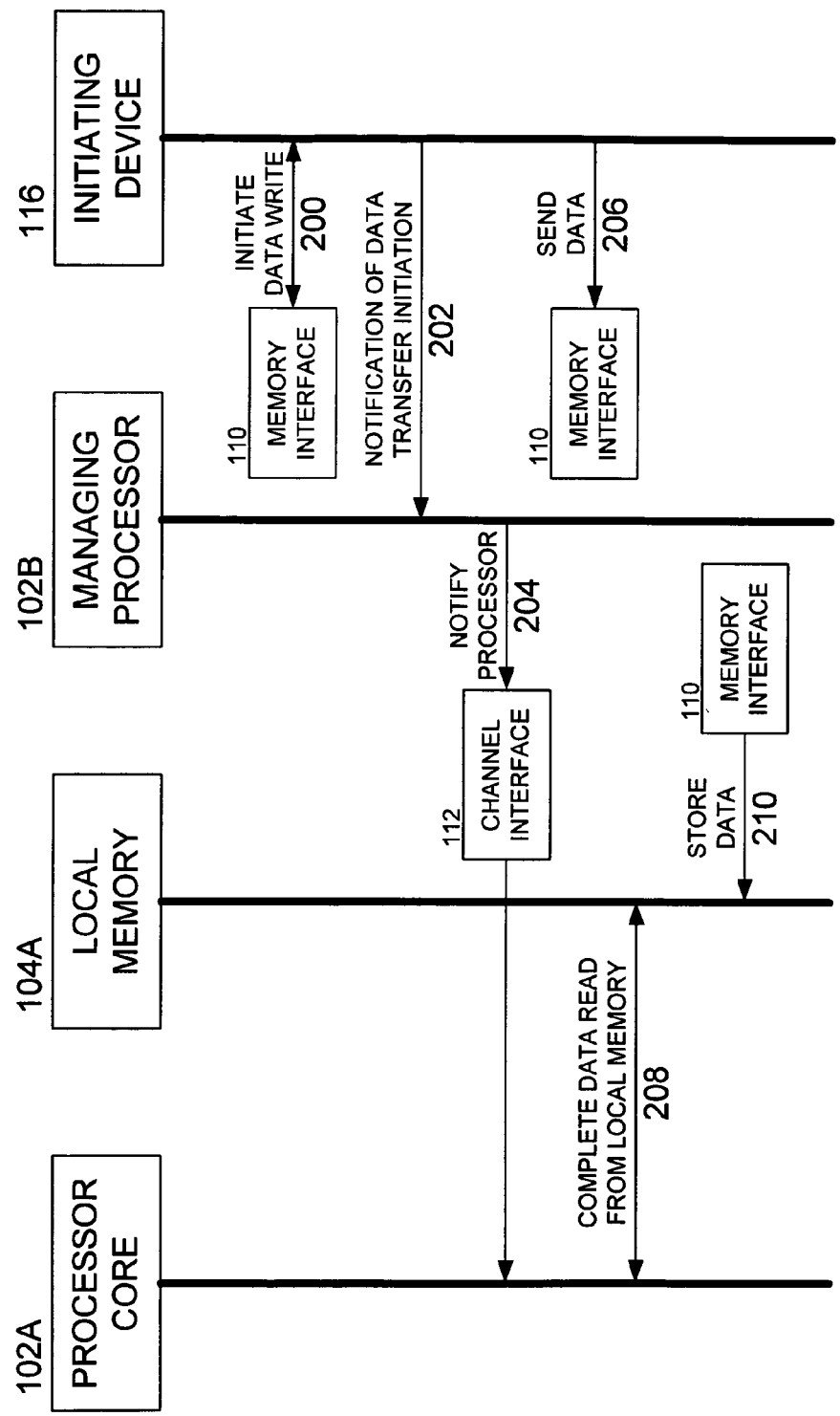
FIG. 3 is an event/flow diagram illustrating process steps that may be carried out by the processing system of FIG. 1 in accordance with one or more aspects of the present invention.

Reference is now made to FIG. 3, which is a flow diagram illustrating a possible data access scenario involving the processor core 102A, the local memory 104A, a managing processor 102B, and an initiating device 116. At action 200, the initiating device 116 initiates a data transfer to the local memory 104A by sending a data transfer instruction to the memory interface circuit 110. This places the memory interface circuit 110 in a position of waiting for the data to be transferred. Next, the initiating device 116 may communicate with the managing processor 102B in order to notify it of the initiation of the data transfer to the local memory 104A (action 202). Such notification may take the form of an interrupt to the managing processor 102B. In its managing role, the managing processor 102B may respond to the interrupt by notifying the processor core 102A by way of the channel interface circuit 112 (action 204).

Sometime after the initiation of the data transfer at action 200, the initiating device 116 may send the data to the memory interface circuit 110 (action 206). It is noted that this represents a delay between the time that the data transfer was initiated (at action 200) and the time at which the memory interface circuit 110 receives the data at action 206. Although the memory interface circuit 110 may or may not have received the data, and before such data is actually stored in the local memory 104A, the processor core 102A may complete a data read from the local memory 104A in response to the notification from the managing processor 102B through the channel interface circuit 112 (action 208).

Note that the data read (action 208) from the local memory 104A occurs before the data are actually stored in the local memory 104A by the memory interface circuit 110 (action 210). This is so because there are multiple functional paths into the local memory 104A, namely, through the memory interface circuit 110 and through the channel interface circuit 112. Thus, the processor core 102A may retrieve old data from the local memory 104A over the BUS 114 instead of the new data stored in the local memory 104A by the memory interface circuit 110 at action 210.

Figure 4:
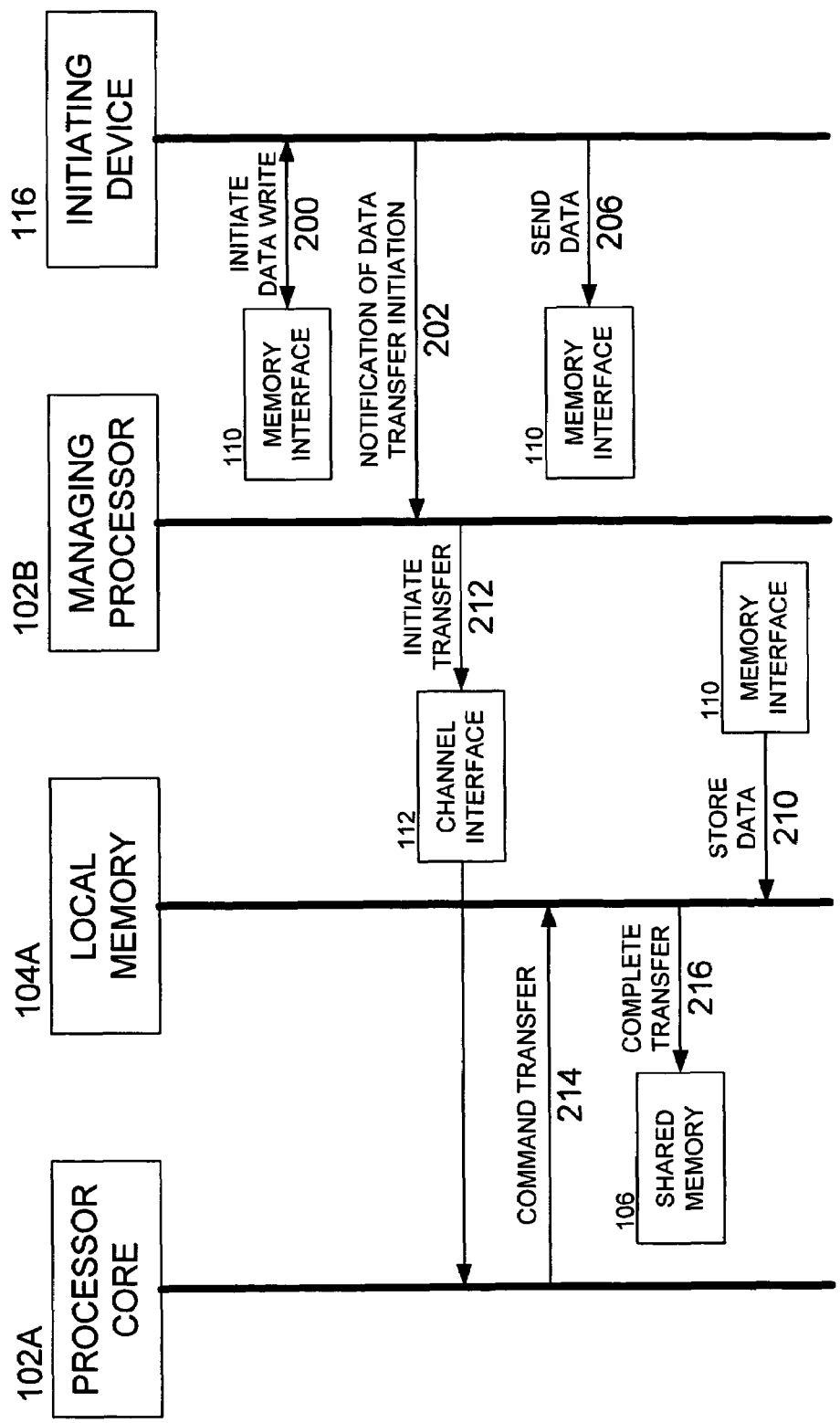
FIG. 4 is an event/flow diagram illustrating further process steps that may be carried out by the processing system of FIG. 1 in accordance with one or more aspects of the present invention.

FIG. 4 illustrates an alternative scenario. At action 200, the initiating device 116 initiates a data transfer to the local memory 104A by sending a data transfer instruction to the memory interface circuit 110. Next, the initiating device 116 may communicate with the managing processor 102B in order to notify it of the initiation of the data transfer to the local memory 104A (action 202), such as by way of an interrupt to the managing processor 102B. In its managing role, the managing processor 102B may initiate a data transfer from the local memory 104A to the shared memory 106 by communicating with the processor core 102A through the channel interface 112 (action 212). In response, the processor core 102A may command the data transfer from the local memory 104A to the shared memory 106 via a DMA command (action 214).

Sometime after the initiation of the data transfer at action 200, the initiating device 116 may send the data to the memory interface circuit 110 (action 206). Again, this represents a delay between the time that the data transfer was initiated (at action 200) and the time at which the memory interface circuit 110 receives the data at action 206, or actually stores the data in the local memory (action 210). Although the memory interface circuit 110 may or may not have received the data, and before such data is actually stored in the local memory 104A, at action 216, the transfer of the data from the local memory 104A to the shared memory 106 may be completed. Thus, the shared memory 106 may receive old data instead of the desired new data due to the multiple functional paths into the local memory 104A facilitated by the processor interface circuit 109.

It is noted that the examples illustrated in FIGS. 3-4 contemplate that the initiating device 116 may be one of the other processors within the system 100 (such as processors 102B-D), or the initiating device 116 may be an external device outside the system 100, but in communication with the system 100 over a network (such as a packet switched data network like the Internet). Further, while it is preferred that a managing processor is involved in the sequence of events, the initiating device 116 may perform the actions illustrated in FIG. 3 and/or FIG. 4 of both the managing processor 102B and the initiating device 116.

Figure 5:
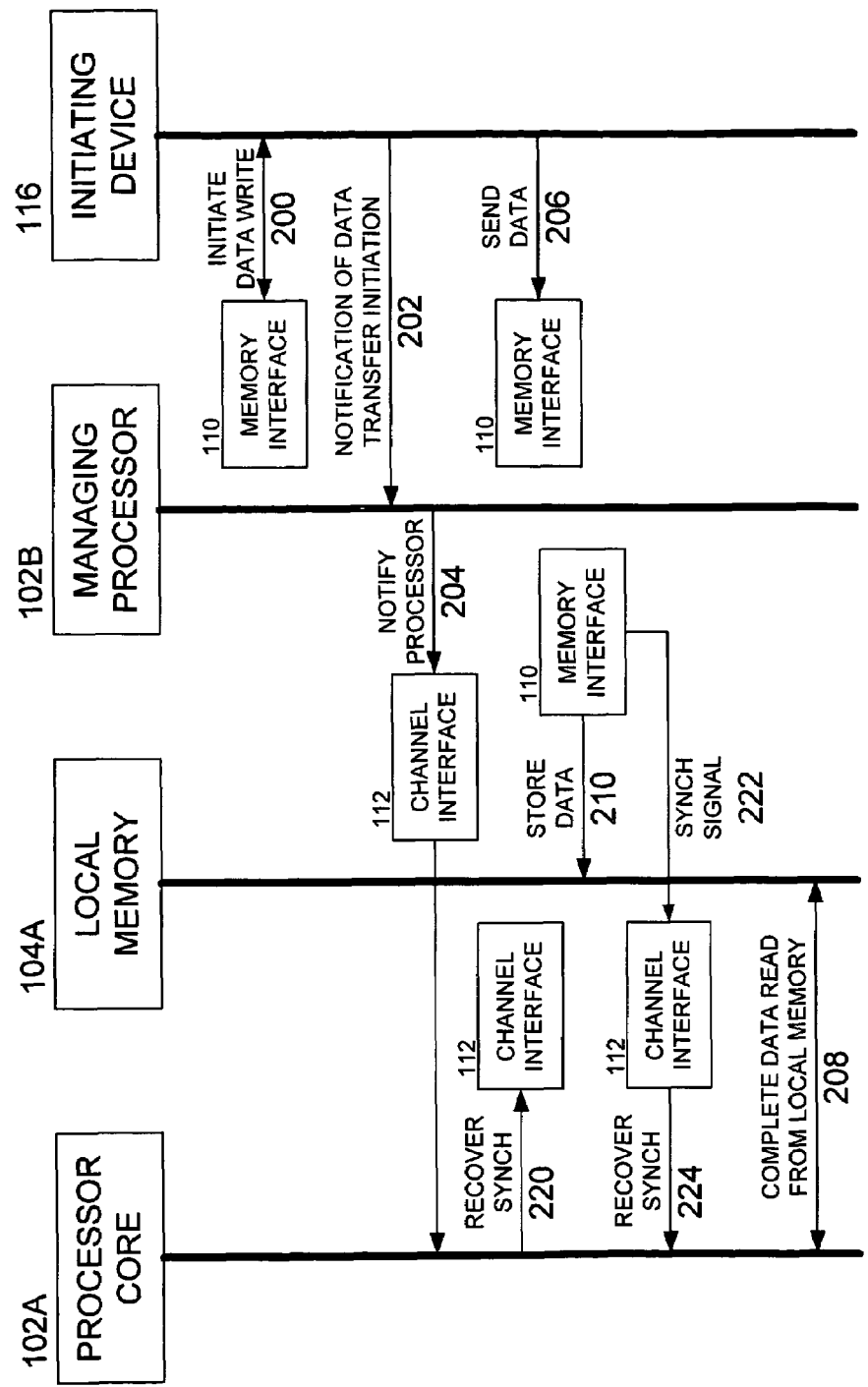
FIG. 5 is an event/flow diagram illustrating still further process steps that may be carried out by the processing system of FIG. 1 in accordance with one or more aspects of the present invention.

Reference is now made to FIG. 5, which illustrates a mechanism by which the synchronization of the transfer of data into the local memory 104A and the subsequent transfer of such data out of the local memory 104A may be controlled through the processor interface circuit 109. Actions 200, 202, and 204 have been discussed with respect to FIG. 3 hereinabove. In response to the notification from the managing processor 102B, the processor core 102A is preferably operable to issue a recover synchronization request to the channel interface circuit 112 (action 220). The memory interface circuit 110 is preferably operable to respond to the recover synchronization request by monitoring the storage of the data in the local memory 104A and producing a synchronization signal when the data transfer into the local memory 104A has been completed (action 222). Preferably, the synchronization signal is communicated to the processor core 102A by way of the channel interface circuit 112 (action 224). In response to the synchronization signal, the processor core 102A may complete its data read into the local memory 104A at a time that insures the new data have been stored within the local memory 104A.

Figure 6:
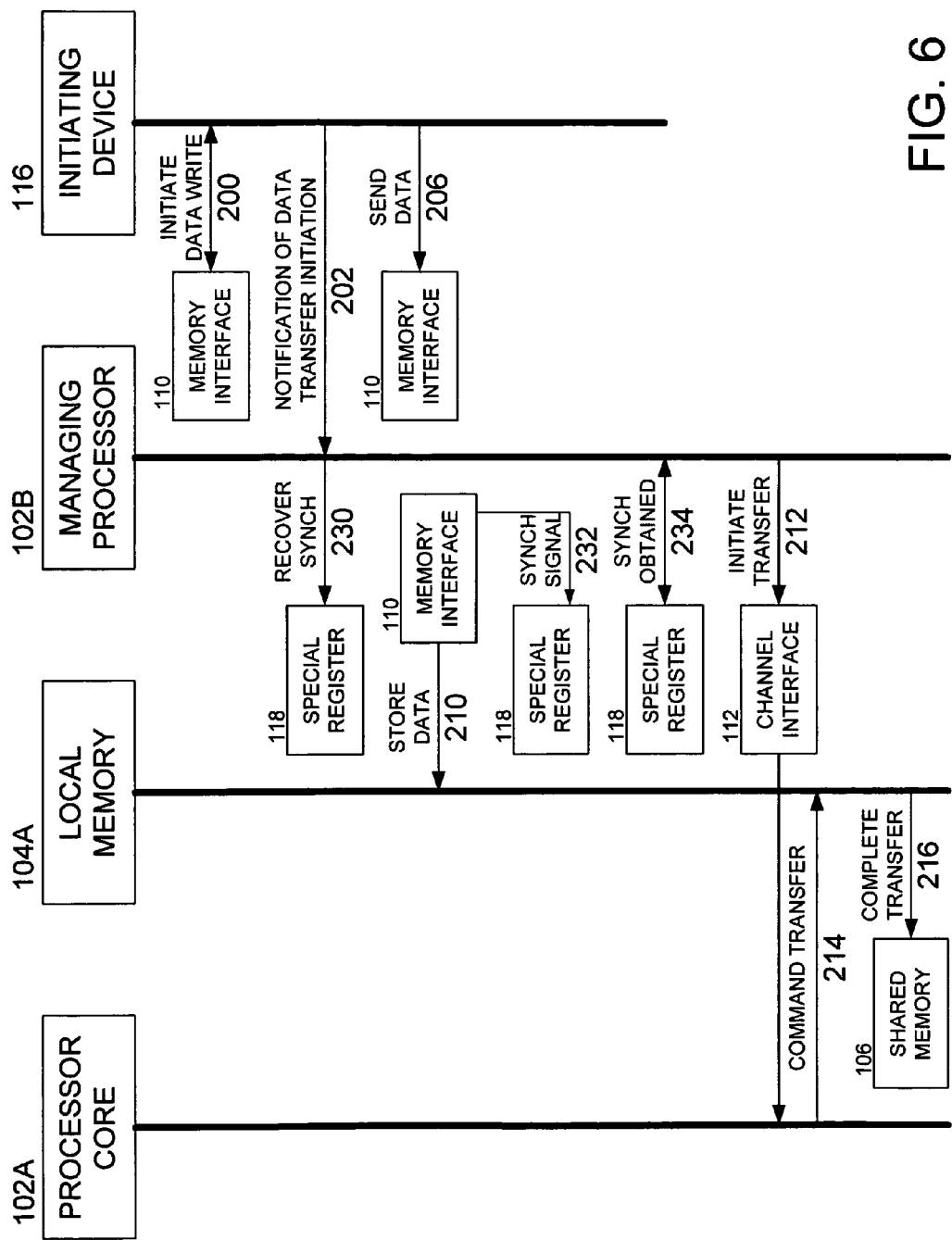
FIG. 6 is an event/flow diagram illustrating still further process steps that may be carried out by the processing system of FIG. 1 in accordance with one or more aspects of the present invention.

Reference is now made to FIG. 6, which illustrates an alternative mechanism by which data transfers into and out of the local memory 104A may be managed to insure that desirable synchronization is achieved. While FIG. 5 was directed to a mechanism by which the processor core 102A initiated the recover synchronization request, FIG. 6 is directed to a technique by which the managing processor 102B (or other processor in the system 100) may initiate the recover synchronization request. Actions 200 and 202 have been discussed in detail hereinabove with respect to FIGS. 3-5. In response to the interrupt from the initiating device 116, the managing processor 102B is preferably operable to issue a recover synchronization request to a special register 118 of the processor interface circuit 109, whereby the memory interface circuit 110 is responsive to the special register 118 by monitoring the data transfer into the local memory 104 (action 210) and issuing a synchronization signal when such data transfer is complete (action 232). By way of example, the synchronization signal may be produced by writing to the special register 118 such that the managing processor 102B may read the special register 118 and recognize that synchronization has been obtained (action 234). Thereafter, the managing processor 102B may initiate a data transfer out of the local memory 104A by writing to the channel interface 112 (action 212). This insures that the subsequent DMA command (action 214) and completion of the data transfer out of the local memory 104A (action 216) occurs after the new data have been stored within the local memory 104A.

Although the channel interface circuit 112 and the special register 118 may be implemented in any number of ways, one or both are preferably operable to change a processor readable value in response to a processor writable instruction. Thus, for example, the issuance of the recover synchronization request by the processor core 102A to the channel interface circuit 112 (action 220, FIG. 5) may be accomplished by writing a synchronization instruction to the channel interface circuit 112 such that the processor readable value indicates that the synchronization request has been made.

The memory interface circuit 110 is preferably operable to read the processor readable value of the channel interface circuit 112 in order to trigger it to monitor the data transfer into the local memory 104A and issue the synchronization signal appropriately. Such trigger may also be achieved via a intermediate signal produced in response to the synchronization request. The memory interface circuit 110 is preferably operable to issue the synchronization signal by writing a synchronization instruction to the channel interface circuit 112 such that the processor readable value indicates that the data transfer into the local memory 104A has been completed (action 222).

In response to the synchronization signal, the processor core 102A may issue a read instruction to the channel interface circuit 112 to obtain the processor readable value indicating that the data transfer into the local memory 104A has been completed (action 224). It is noted that the processor core 102A may be poll the channel interface circuit 112 in order to obtain the synchronization signal, and/or it may obtain the synchronization signal upon an interrupt.

By way of further example, the special register 118 may operate in a similar way as discussed hereinabove with respect to the channel interface circuit 112 in that one or more of the bits of the register may indicate the issuance of a recover synchronization signal and/or the issuance of the synchronization signal.

It is noted that the examples illustrated in FIGS. 5-6 contemplate that the initiating device 116 may be one of the other processors within the system 100, such as processors 102B-D. Further, while it is preferred that a managing processor is involved in the sequence of events, the initiating device 116 may perform the actions illustrated in FIGS. 5-6 of both the managing processor 102B and the initiating device 116. For example, the initiating device may initiate the data transfer (action 200) and notify the processor core 102A of the initiation of the data transfer (action 204) illustrated in FIG. 5. Similarly, with respect to FIG. 6, the initiating device 116 may initiate the data transfer (action 200), issue the recover synchronization request (action 230), obtain the synchronization indication (action 234), and initiate a data transfer out of the local memory 104A upon receiving the synchronization indication (action 212).

In one or more alternative embodiments, the initiating device 116 may be an external device outside the system 100, but in communication with the system 100 over a network, such as a packet switched data network like the Internet. In such embodiments, the external device 116 may initiate the data transfer into the local memory 104A (action 200) and then notify another of the processors, such as processor 102B via an interrupt to provide a notification that the data transfer has been initiated (action 202). Thereafter, the processor 102B may act as a managing processor to carry out the other actions illustrated in FIG. 5 and/or FIG. 6.

Figure 7:
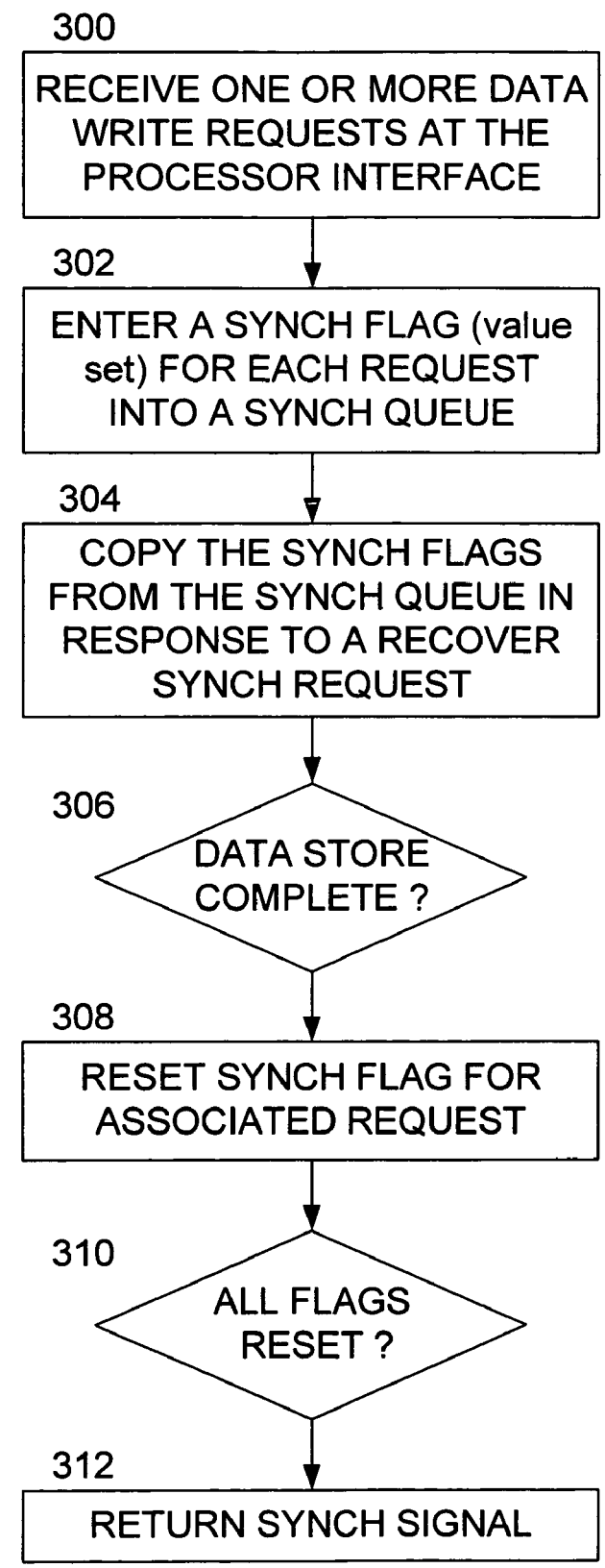
FIG. 7 is a flow diagram illustrating still further process steps that may be carried out by the processing system of FIG. 1 in accordance with one or more aspects of the present invention.

Reference in now made to FIG. 7, which is a flow diagram illustrating features that may be individually and/or collectively utilized in one or more embodiments of the present invention. The flow diagram of FIG. 7 generally illustrates a preference that the processor interface circuit 109 is capable of monitoring multiple data transfers into the local memory 104A, which may be initiated by the same device and/or which may be initiated by different devices in the system 100 and/or external to the system 100. Thus, the processor interface circuit 109 is preferably operable to produce a synchronization signal indicating that a plurality of data transfers into the local memory 104A have been competed.

At action 300, the processor interface circuit 109 may receive multiple write requests into the local memory 104A. Preferably, the processor interface circuit 109 includes a synchronization queue 113 having a respective synchronization flag for each initiated data transfer into the local memory 104A. Each synchronization flag is preferably "set" when the associated data transfer has been initiated but has not been completed. The number of synchronization flags in the synchronization queue 113 preferably grows as the number of initiated data transfers into the local memory 104A grows.

When the processor interface circuit 109 receives a recover synchronization request, however, the values of the synchronization flags are preferably stored in a storage circuit 115 as a group or set. It is noted that a single synchronization request, which may be initiated with respect to only one of the plurality of initiated data transfers, causes a set of synchronization flag values to be stored in the storage circuit 115 even though such values are associated with more than one data transfer. Advantageously, this simplifies the implementation and control of the synchronization circuitry.

As the data transfers into the local memory 104A are completed, the stored values of the synchronization flags within the storage circuit 115 are reset (actions 306-308). Once all of the values of the synchronization flags in the set are reset (action 310), the processor interface circuit 109 preferably issues the synchronization signal (action 312).

When more than one recover synchronization request is received by the processor interface circuit 109 over a period of time (action 304), multiple sets of synchronization flag values are stored in the storage circuit 115 and treated separately as to the completion of the respective data transfers into the local memory 104A. Thus, the processor interface circuit 109 may issue multiple synchronization signals as each set of synchronization flag values are reset.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 8:
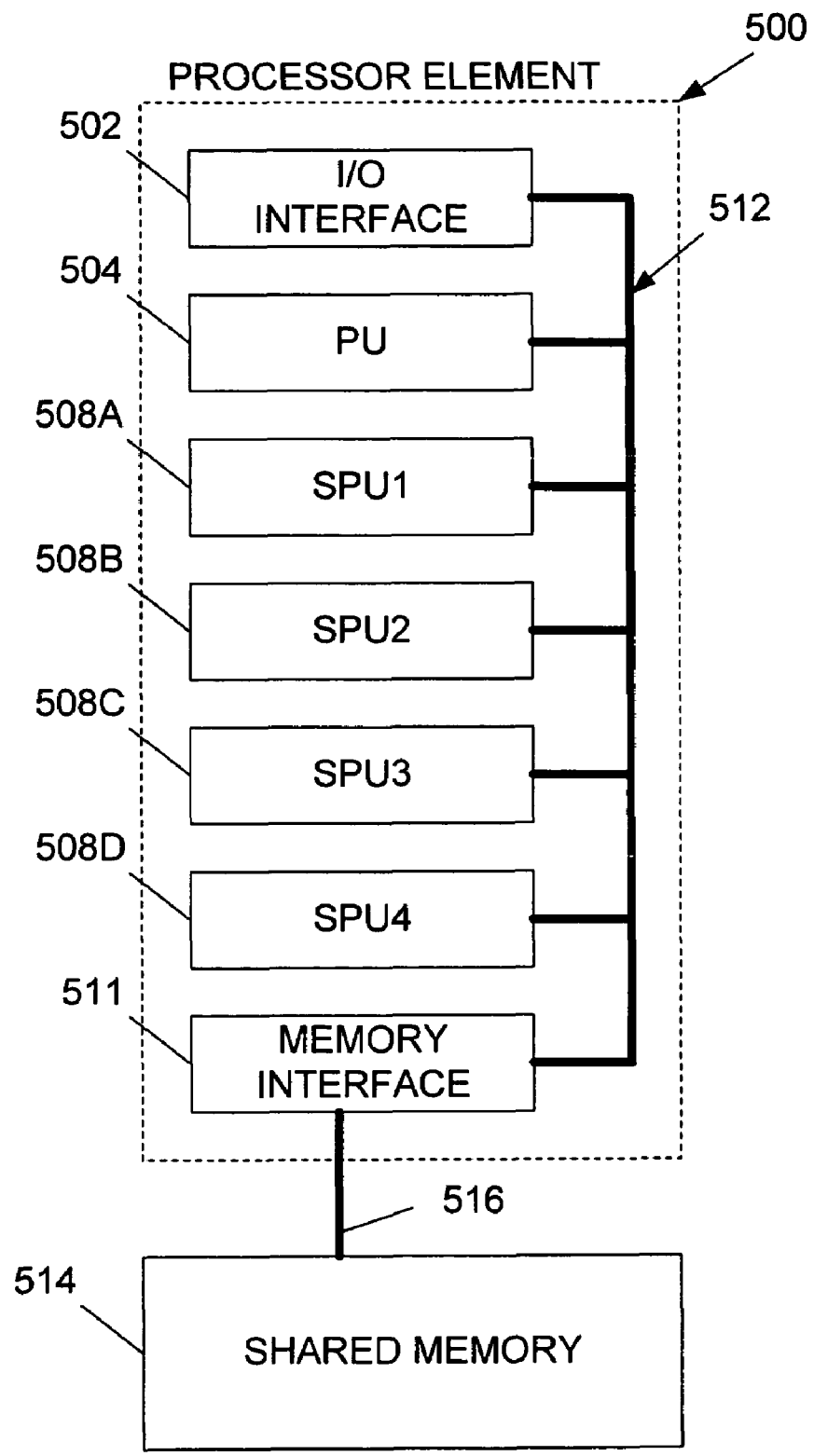
FIG. 8 is a diagram illustrating a preferred processor element (PE) that may be used to implement one or more further aspects of the present invention.

With reference to FIG. 8, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 9:
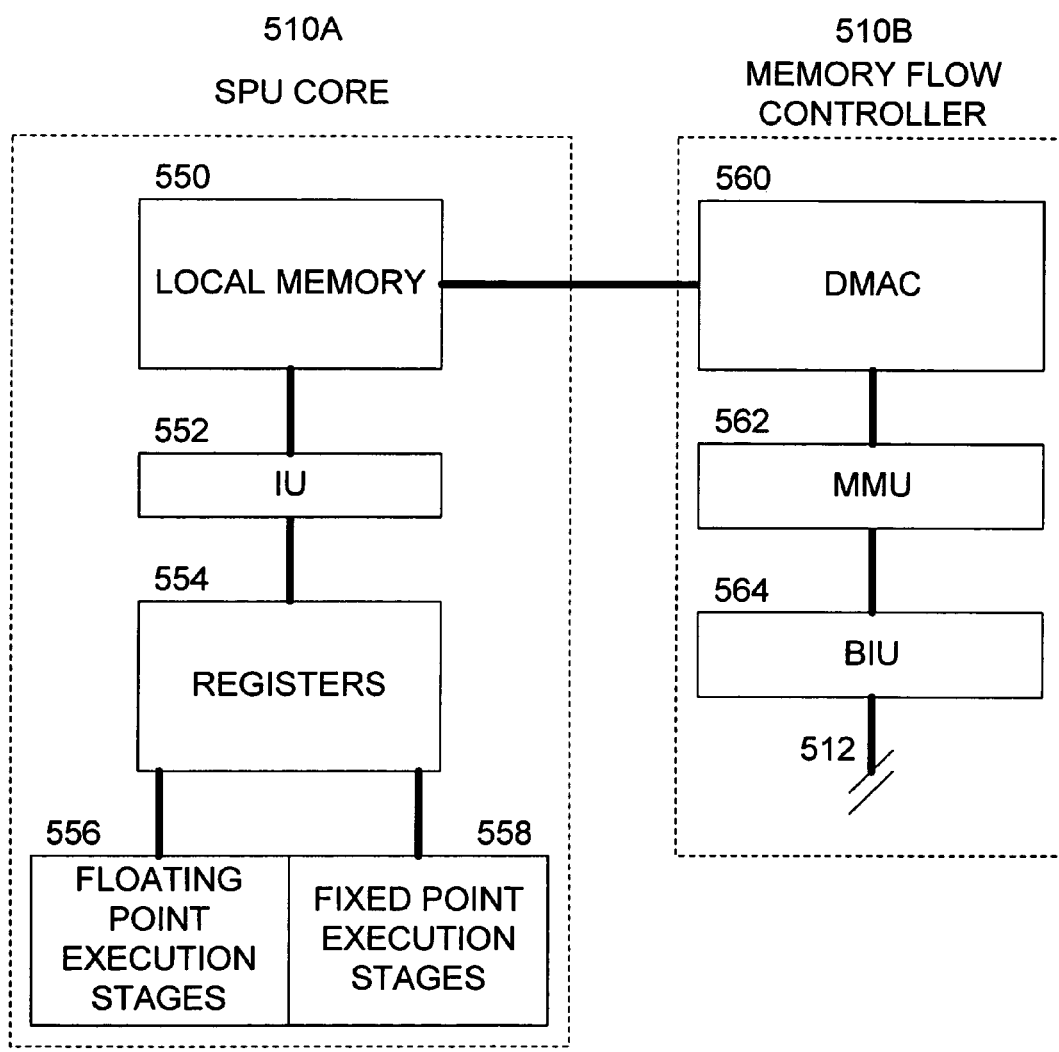
FIG. 9 is a diagram illustrating the structure of an exemplary sub-processing unit (SPU) of the system of FIG. 8 in accordance with one or more further aspects of the present invention.

FIG. 9 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

The SPUs 508 employ SPU channels through which programs running on the SPU communicate with the other SPUs, the PU, or other devices. Such communication includes one or more of inter-processor communication mailboxes and signal notification registers, DMA command issuance and status, decrementer (Timer) access, and event status.

The channels are accessed from the program code using specific channel instructions. These instructions include: Read Channel (which causes a read of data stored in the addressed channel to be loaded into a selected register file); Write Channel (which causes data to be read form a selected register file and stored in the addressed channel); and Read Channel Count (which causes the count associated with the addressed channel to be stored in the a selected register file).

Some or all of the SPU channels may have a count associated with them, which count is decremented whenever a channel instruction is issued to that specific channel (number), and incremented whenever a external event socketed with that channel occurs.

The SPUs 508 may also include memory management I/O (MMIO) registers that control the configuration and operation of the SPUs 508 The MMIO registers may be read and written through the channel interfaces. The MMIO registers may be used for initialization and control of the SPU, error and debug monitoring and control, inter-processor communication via mailboxes and notification registers (where such registers are mapped to the channels).

In the context of the various features of the present invention, one or more of the SPU channels may be used to facilitate the inter-processor communications described hereinabove. This provides the program software running on one or more of the SPUs 508 with a mechanism to achieve cumulative ordering across the local storage 550 and PU 504 address domains. Ordering of storage accesses performed by multiple sources (i.e. two or more processors or units) with respect to another processor or unit is referred to as cumulative ordering.

Two independent synchronization facilities may be provided, namely, the MMIO SPC Multi Source Synchronization facility and the channel SPC Multi Source Synchronization facility. The MMIO facility allows processors and/or units to control synchronization from the PU 504 address domain and the channel facility allows an SPU 508 to control synchronization from the local storage 550 address domain. Both these facilities ensure transfers where the destination is the associated MFC 510B (i.e. write transfers targeting the MFC) and received prior the SPC Multi Source Synchronization request are complete.

The MMIO facility may be accessed using an MMIO register, which may be named the SPC_MSSync. Writing any value to this register causes the MFC 510B to track all pending transfers targeted at the associated SPU 508 received prior to the MMIO SPC_MSSync write. A read of the SPC_MSSync register will return a value of one if any transfers being tracked are still outstanding. When all the transfers being tracked are complete, a read of this register will return a value of zero.

To use the MMIO facility, a program may perform the following steps: 1. write to the SPC_MSSync register; and 2. poll the SPC_MSSync register until a value of 0 is received.

The channel facility may include an SPC_MSSyncReq channel and an external event and mask. Writing any value to the SPC_MSSynCReq channel requests confirmation that all outstanding transfers, prior to the sync request, targeting the associated MFC 508B are complete.

To use the channel facility, a program may perform the following steps: 1. write to the SPC_MSSyncReq channel; and 2. wait for the SPC_MSSyncReq channel to become available (e.g., the channel count is set back to one).

Figure 10:
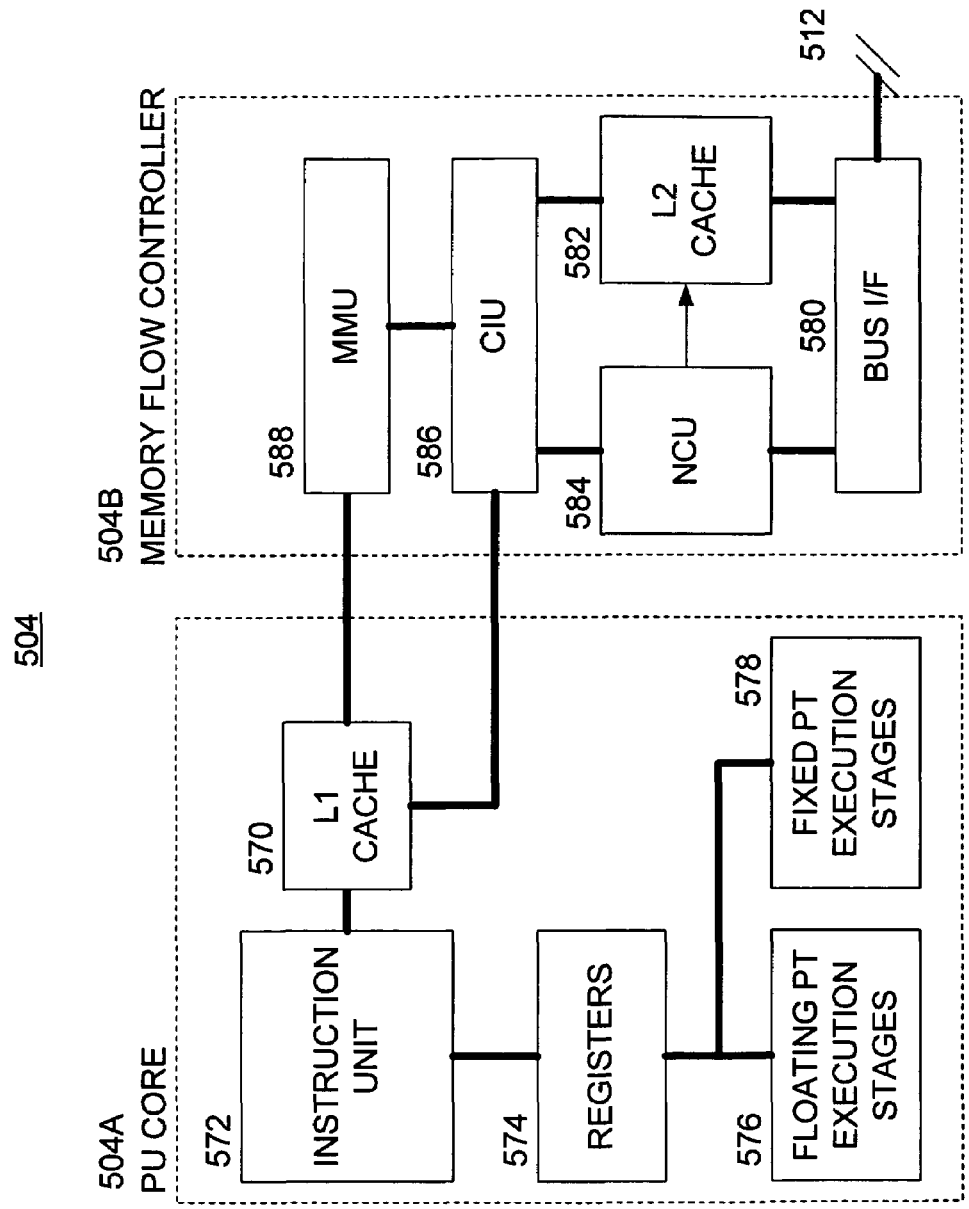
FIG. 10 is a diagram illustrating the structure of an exemplary processing unit (PU) of the system of FIG. 8 in accordance with one or more further aspects of the present invention.

FIG. 10 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
   a plurality of parallel processors capable of operative communication with a shared memory;
   a local memory operatively coupled to a first of the processors such that data may be transferred between the shared memory and the local memory for execution of one or more programs therein;
   a memory interface circuit, including a Direct Memory Access Controller (DMAC) operable to facilitate data transfers into and out of the local memory of the first processor over a first data transfer path;

a channel interface circuit operable to facilitate data transfers into and out of the local memory of the first processor from and to others of the processors over a second data transfer path;

a synchronization queue having a respective synchronization flag for each initiated data transfer into the local memory; and a storage circuit, wherein the memory interface circuit is operable to:

copy a first value of the respective synchronization flag associated with a first data transfer into the storage circuit in response to a first recover synchronization request, the first data transfer being facilitated by the DMAC circuit over the first data transfer path into at least a first location in the local memory of the first processor, change the first value within the storage circuit in response to completion of the first data transfer into the local memory, and produce a first synchronization signal when the first value indicates that the first data transfer into the local memory has been completed, the first synchronization signal indicating that a data transfer from the at least first location in the local memory of the first processor over the second data transfer path using the channel interface circuit would result in valid data being read.

2. The apparatus of claim 1, wherein the first processor is operable to read the transferred data from the local memory in response to the synchronization signal.

3. The apparatus of claim 1, wherein the first processor is operable to initiate a transfer of the transferred data from the local memory to the shared memory in response to the synchronization signal.

4. The apparatus of claim 1, wherein the memory interface circuit is operable to produce the synchronization signal in response to: (i) a recover synchronization request by the first processor, and (ii) completion of the data transfer into the local memory.

5. The apparatus of claim 4, wherein:

the channel interface circuit is operable to change a processor readable value in response to a processor writable instruction; and the recover synchronization request is issued by the first processor by writing a synchronization instruction to the channel interface circuit such that the processor readable value indicates that the synchronization request has been made.

6. The apparatus of claim 5, wherein the memory interface circuit is operable to produce the synchronization signal by writing a synchronization instruction to the channel interface circuit such that the processor readable value indicates that the data transfer into the local memory has been completed.

7. The apparatus of claim 6, wherein the memory interface circuit is operable to at least initiate the production of the synchronization signal by monitoring when the data transfer into the local memory has been completed.

8. The apparatus of claim 6, wherein the first processor is operable to receive the synchronization signal by issuing a read instruction to the channel interface circuit and in response obtaining the processor readable value indicating that the data transfer into the local memory has been completed.

9. The apparatus of claim 6, wherein the first processor is operable to at least one of: (i) read the transferred data from the local memory, and (ii) initiate a transfer of the transferred data from the local memory to the shared memory, each in response to the synchronization signal.

10. The apparatus of claim 1, wherein the first processor is operable to issue a recover synchronization request for the synchronization signal to the processor interface circuit in response to a notification signal issued by a second one of the processors indicating that the data transfer to the local memory has been initiated.

11. The apparatus of claim 10, wherein the second processor initiates the data transfer into the local memory.

12. The apparatus of claim 10, wherein:

a device other than the other parallel processors initiates the data transfer into the local memory; and the device interrupts the second processor to indicate that the data transfer has been initiated.

13. The apparatus of claim 10, wherein:

the channel interface circuit is operable to change a processor readable value in response to a processor writable instruction;

the notification signal is issued by the second processor by writing a synchronization instruction to the channel interface circuit such that the processor readable value indicates that the data transfer to the local memory has been initiated; and the first processor is operable to receive the notification signal by issuing a read instruction to the channel interface circuit, and in response obtaining the processor readable value.

14. The apparatus of claim 1, wherein the local memory is not a hardware cache memory.

15. An apparatus, comprising:

a plurality of parallel processors capable of operative communication with a shared memory;

a plurality of local memories, each being operatively coupled to a respective one of the processors such that data may be transferred between the shared memory and the local memory for execution of one or more programs therein;

a plurality of memory interface circuits, each including a Direct Memory Access Controller (DMAC) operable to facilitate data transfers into and out of a respective one of the local memories over a respective first data transfer path;

a plurality of channel interface circuits, each operable to facilitate data transfers into and out of a respective one of the local memories from and to others of the processors over a respective second data transfer path;

a plurality of synchronization queues, each having a respective synchronization flag for each initiated data transfer into a respective one of the local memories, and a storage circuit, wherein each of the memory interface circuits is operable to:

copy a first value of the respective synchronization flags associated with a first data transfer into the respective storage circuit in response to a first recover synchronization request, the first data transfer being facilitated by the respective DMAC circuit over the respective first data transfer path into at least a first location in the respective local memory change the first value within the respective storage circuit in response to completion of the first data transfer into the respective local memory, and produce a first synchronization signal when the first value indicates that the first data transfer into the respective local memory has been completed, the first synchronization signal indicating that a data transfer from the at least first location in the respective local memory over the respective second data transfer path using the respective channel interface circuit would result in valid data being read.

16. An apparatus, comprising:
a plurality of parallel processors capable of operative communication with a shared memory;
a local memory operatively coupled to a first of the processors such that data may be transferred between the shared memory and the local memory for execution of one or more programs therein;
a memory interface circuit, including a Direct Memory Access Controller (DMAC) operable to facilitate data transfers into and out of the local memory of the first processor over a first data transfer path;
a channel interface circuit operable to facilitate data transfers into and out of the local memory of the first processor from and to others of the processors over a second data transfer path;
a synchronization queue having a respective synchronization flag for each initiated data transfer into the local memory; and
a storage circuit,
wherein the memory interface circuit is operable to:
copy a first value of the respective synchronization flag associated with a first data transfer into the storage circuit in response to a first recover synchronization request, the first data transfer being facilitated by the DMAC circuit over the first data transfer path into at least a first location in the local memory of the first processor,
change the first value within the storage circuit in response to completion of the first data transfer into the local memory, and
produce a first synchronization signal in response to a recover synchronization request by a second one of the processors and when the first value indicates that the first data transfer into the local memory has been completed, the first synchronization signal indicating that a data transfer from the at least first location in the local memory of the first processor over the second data transfer path using the channel interface circuit would result in valid data being read.

17. The apparatus of claim 16, wherein:
the channel interface circuit operable to change a processor readable value in response to a processor writable instruction; and
the recover synchronization request is issued by the second processor by writing a synchronization instruction to the channel interface circuit such that the processor readable value indicates that the synchronization request has been made.

18. The apparatus of claim 17, wherein:
the memory interface circuit is operable to at least initiate the production of the synchronization signal by monitoring when the data transfer into the local memory has been completed; and
the memory interface circuit is operable to produce the synchronization signal by writing a synchronization instruction to the channel interface circuit such that the processor readable value indicates that the data transfer into the local memory has been completed.

19. The apparatus of claim 16, wherein the first processor is operable to at least one of: (i) read the transferred data from the local memory, and (ii) initiate a transfer of the transferred data from the local memory to the shared memory, each in response to a notification signal from the second processor indicating that the data transfer to the local memory has been completed.

20. The apparatus of claim 16, wherein:
a device other than the other parallel processors initiates the data transfer into the local memory; and
the device interrupts the second processor to indicate that the data transfer has been initiated.

21. The apparatus of claim 16, further comprising:
a plurality of local memories, each being operatively coupled to a respective one of the processors such that data may be transferred between the shared memory and the local memory for execution of one or more programs therein; and
a plurality of memory interface circuits, each coupled to a respective one of the processors and the local memory thereof and each operable to separately: (i) facilitate data transfers into and out of the local memory, and (ii) facilitate communication between the other processors and the respective processor,
wherein each of the memory interface circuits is operable to produce a synchronization signal indicating that a data transfer into the respective local memory has been completed in response to: (i) a recover synchronization request by one of the processors other than the respective processor, and (ii) completion of the data transfer into the respective local memory.

22. The apparatus of claim 15, wherein each of the plurality of local memories is not a hardware cache memory.

23. An apparatus, comprising:
a plurality of parallel processors capable of operative communication with a shared memory;
a local memory operatively coupled to a first of the processors such that data may be transferred between the shared memory and the local memory for execution of one or more programs therein;
a memory interface circuit, including a Direct Memory Access Controller (DMAC) operable to facilitate data transfers into and out of the local memory of the first processor over a first data transfer path;
a channel interface circuit operable to facilitate data transfers into and out of the local memory of the first processor from and to others of the processors over a second data transfer path;
a synchronization queue having a respective synchronization flag for each initiated data transfer into the local memory; and
a storage circuit,
wherein the memory interface circuit is operable to:
copy a first set of the values of the respective synchronization flags associated with a first set of data transfers into the storage circuit in response to a first recover synchronization request, the first set of data transfers being facilitated by the DMAC circuit over the first data transfer path into at least first locations in the local memory of the first processor,
change the first set of values within the storage circuit in response to respective completions of the respective data transfers into the local memory, and
produce a first synchronization signal when the first set of values indicates that the first set of data transfers into the local memory has been completed, the first synchronization signal indicating that data transfers from the at least first locations in the local memory of the first processor over the second data transfer path using the channel interface circuit would result in valid data being read.

24. The apparatus of claim 23, wherein:
the plurality of data transfers includes at least a second set of data transfers;
the memory interface circuit is operable to copy a second set of the values of the synchronization flags associated with the second set of data transfers into the storage circuit in response to a second recover synchronization request;
the memory interface circuit is operable to change the second set of values within the storage circuit in response to respective completions of the respective second set of data transfers into the local memory; and
the memory interface circuit is operable to produce a second synchronization signal when the second set of values indicates that the second set of data transfers into the local memory has been completed.

25. The apparatus of claim 23, wherein the local memory is not a hardware cache memory.

26. An apparatus, comprising:
a plurality of parallel processors capable of operative communication with a shared memory;
a local memory operatively coupled to a first of the processors such that data may be transferred between the shared memory and the local memory for execution of one or more programs therein;
a memory interface circuit, including a Direct Memory Access Controller (DMAC) operable to facilitate data transfers into and out of the local memory of the first processor over a first data transfer path;
a channel interface circuit operable to facilitate data transfers into and out of the local memory of the first processor from and to others of the processors over a second data transfer path;
a synchronization queue having a respective synchronization flag for each initiated data transfer into the local memory; and
a storage circuit,
wherein the memory interface circuit is operable to:
copy a value of the respective synchronization flags associated with a data transfer into the storage circuit in response to a recover synchronization request by at least one of the first processor and a second one of the processors, the data transfer being facilitated by the DMAC circuit over the first data transfer path into at least a first location in the local memory of the first processor,
change the value within the storage circuit in response to completion of the data transfer into the local memory, and
produce a synchronization signal indicating that the data transfer into the local memory has been completed in response to the value indicating that the data transfer into the local memory has been completed, the synchronization signal indicating that a data transfer from the at least first location in the local memory of the first processor over the second data transfer path using the channel interface circuit would result in valid data being read,
wherein the at least one of the first and second processors is operable to issue the recover synchronization request in response to initiation of the data transfer to the local memory by an external device in operative communication with the apparatus through a communication network.

27. The apparatus of claim 26, wherein the external device issues an interrupt signal to the second processor to indicate that the data transfer has been initiated.

28. The apparatus of claim 27, wherein the second processor is operable to produce a notification signal to the first processor to indicate that the data transfer has been initiated.

29. The apparatus of claim 26, wherein the first processor is operable to at least one of: (i) read the transferred data from the local memory, and (ii) initiate a transfer of the transferred data from the local memory to the shared memory, each in response to the synchronization signal.

30. The apparatus of claim 26, wherein the local memory is not a hardware cache memory.

31. A method, comprising:
receiving a request from an initiating device to initiate a data transfer into a local memory for execution of one or more programs therein, the local memory being operatively coupled to a first of a plurality of parallel processors capable of operative communication with a shared memory;
facilitating the data transfer into the local memory over a first data transfer path using a memory interface circuit, including a Direct Memory Access Controller (DMAC);
facilitating data transfers into and out of the local memory of the first processor from and to others of the processors over a second data transfer path using a channel interface circuit;
copying a value of a respective synchronization flag associated with the data transfer from a synchronization queue, having a respective synchronization flag for each initiated data transfer into the local memory, into a storage circuit in response to a first recover synchronization request, the data transfer being facilitated by the DMAC circuit over the first data path into at least a first location in the local memory of the first processor;
changing the value within the storage circuit in response to completion of the data transfer into the local memory; and
producing a synchronization signal when the value indicates that the data transfer into the local memory has been completed, the synchronization signal indicating that a data transfer from the at least first location in the local memory of the first processor over the second data transfer path using the channel interface circuit would result in valid data being read.

32. The method of claim 31, further comprising reading the transferred data from the local memory into the first processor in response to the synchronization signal.

33. The method of claim 31, further comprising initiating a transfer of the transferred data from the local memory to the shared memory by the first processor in response to the synchronization signal.

34. The method of claim 31, further comprising producing the synchronization signal in response to: (i) a recover synchronization request by the first processor, and (ii) completion of the data transfer into the local memory.

35. The method of claim 31, further comprising:
receiving a notification signal at the first processor from a second one of the processors indicating that the data transfer to the local memory has been initiated; and
issuing a recover synchronization request from the first processor for the synchronization signal such that the first processor may receive notification that the data transfer into the local memory has been completed.

36. The method of claim 35, wherein initiating device is the second processor, which initiates the data transfer into the local memory.

37. The method of claim 35, wherein:
the initiating device is not one of the parallel processors; and the initiating device interrupts the second processor to indicate that the data transfer has been initiated.

38. A method, comprising:

receiving a request from an initiating device to initiate a data transfer into a local memory for execution of one or more programs therein, the local memory being operatively coupled to a first of a plurality of parallel processors capable of operative communication with a shared memory;

facilitating the data transfer into the local memory over a first data transfer path using a memory interface circuit, including a Direct Memory Access Controller (DMAC);

facilitating data transfers into and out of the local memory of the first processor from and to others of the processors over a second data transfer path using a channel interface circuit;

receiving a notification signal at a second one of the plurality of processors from the initiating device indicating that the data transfer to the local memory has been initiated;

issuing a recover synchronization request from the second processor for a synchronization signal such that the second processor may receive notification that the data transfer into the local memory has been completed;

copying a value of a respective synchronization flag associated with the data transfer from a synchronization queue, having a respective synchronization flag for each initiated data transfer into the local memory, into a storage circuit in response to the recover synchronization request, the data transfer being facilitated by the DMAC circuit over the first data path into at least a first location in the local memory of the first processor;

changing the value within the storage circuit in response to completion of the data transfer into the local memory; and producing the synchronization signal when the value indicates the data transfer into the local memory has been completed, the synchronization signal indicating that a data transfer from the at least first location in the local memory of the first processor over the second data transfer path using the channel interface circuit would result in valid data being read.

39. The method of claim 38, further comprising at least one of: (i) reading the transferred data from the local memory, and (ii) initiating a transfer of the transferred data from the local memory to the shared memory, each in response to a notification signal from the second processor indicating that the data transfer to the local memory has been completed.

40. A method, comprising:

receiving a request from an external device to initiate a data transfer into a local memory for execution of one or more programs therein, the local memory being operatively coupled to a first of a plurality of parallel processors capable of operative communication with a shared memory, the external device being in operative communication with the parallel processors through a communication network;

receiving a notification signal at one of the first processor and a second one of the plurality of processors from the external device indicating that the data transfer to the local memory has been initiated;

issuing a recover synchronization request from one of the first and second processors for a synchronization signal such that the one of the first and second processors may receive notification that the data transfer into the local memory has been completed;

copying a value of a respective synchronization flag associated with the data transfer from a synchronization queue, having a respective synchronization flag for each initiated data transfer into the local memory, into a storage circuit in response to the recover synchronization request, the data transfer being facilitated by a Direct Memory Access Controller (DMAC) circuit over a first data path into at least a first location in the local memory of the first processor;

changing the value within the storage circuit in response to completion of the data transfer into the local memory; and producing the synchronization signal when the value indicates that the data transfer into the local memory has been completed, the synchronization signal indicating that a data transfer from the at least first location in the local memory of the first processor over a second data transfer path using a channel interface circuit would result in valid data being read.

41. The method of claim 40, wherein the external device issues an interrupt signal to the second processor to indicate that the data transfer has been initiated.

42. The method of claim 41, further comprising issuing a notification signal from the second processor to the first processor to indicate that the data transfer has been initiated.

43. A method, comprising:

receiving a plurality of requests from one or more initiating devices, each request initiating a data transfer into a local memory for execution of one or more programs therein, the local memory being operatively coupled to a first of a plurality of parallel processors capable of operative communication with a shared memory;

copying a first set of values of respective synchronization flags associated with a first set of the data transfers from a synchronization queue, having a respective synchronization flag for each initiated data transfer into the local memory, into a storage circuit in response to one or more recover synchronization request for a synchronization signal, the first set of data transfers being into the local memory over a first data transfer path using a memory interface circuit, including a Direct Memory Access Controller (DMAC);

changing the first set of values within the storage circuit in response to completion of the first set of data transfers into the local memory; and producing a synchronization signal indicating that the first set of data transfers into the local memory has been completed, the synchronization signal indicating that data transfers from the local memory of the first processor over a second data transfer path using a channel interface circuit would result in valid data being read.

44. A storage medium containing a software program, the software program being operable to cause a processor to execute actions including:

receiving a request from an initiating device to initiate a data transfer into a local memory for execution of one or more programs therein, the local memory being operatively coupled to a first of a plurality of parallel processors capable of operative communication with a shared memory;

facilitating the data transfer into the local memory over a first data transfer path using a memory interface circuit, including a Direct Memory Access Controller (DMAC);

facilitating data transfers into and out of the local memory of the first processor from and to others of the processors over a second data transfer path using a channel interface circuit;

copying a value of a respective synchronization flag associated with the data transfer from a synchronization queue, having a respective synchronization flag for each initiated data transfer into the local memory, into a storage circuit in response to one or more recover synchronization request for a synchronization signal the data transfer being facilitated by the DMAC circuit over the first data path into at least a first location in the local memory of the first processor;

changing the value within the storage circuit in response to completion of the data transfer into the local memory; and producing a synchronization signal when the value indicates that the data transfer into the local memory has been completed, the synchronization signal indicating that a data transfer from the at least first location in the local memory of the first processor over the second data transfer path using the channel interface circuit would result in valid data being read.

45. A storage medium containing a software program, the software program being operable to cause a processor to execute actions including:

receiving a request from an external device to initiate a data transfer into a local memory for execution of one or more programs therein, the local memory being operatively coupled to a first of a plurality of parallel processors capable of operative communication with a shared memory, the external device being in operative communication with the parallel processors through a communication network;

receiving a notification signal at one of the first processor and a second one of the plurality of processors from the external device indicating that the data transfer to the local memory has been initiated;

issuing a recover synchronization request from one of the first and second processors for a synchronization signal such that the one of the first and second processors may receive notification that the data transfer into the local memory has been completed;

copying a value of a respective synchronization flag associated with the data transfer from a synchronization queue, having a respective synchronization flag for each initiated data transfer into the local memory, into a storage circuit in response to the recover synchronization request, the data transfer being facilitated by a Direct Memory Access Controller (DMAC) circuit over a first data path into at least a first location in the local memory of the first processor;

changing the value within the storage circuit in response to completion of the data transfer into the local memory; and producing the synchronization signal when the value indicates that the data transfer into the local memory has been completed, the synchronization signal indicating that a data transfer from the at least first location in the local memory of the first processor over a second data transfer path using a channel interface circuit would result in valid data being read.

46. An apparatus, comprising:

a shared memory;

a plurality of parallel processors capable of operative communication with the shared memory, each processor including a processor core unit and a memory controller unit;

a plurality of local memories, each being disposed in a respective one of the processor core units such that data may be transferred between the shared memory and the respective local memories for execution of one or more programs therein;

a plurality of memory interface circuits, each being disposed in a respective one of the processor core units, and each being operable to facilitate data transfers into and out of a respective one of the local memories over a respective first data transfer path;

a plurality of Direct Memory Access Controller (DMAC) controllers, each being disposed in a respective one of the memory controller units, operatively coupled to a respective one of the memory interface circuits, and operable to facilitate data transfers between a respective one of the local memories and the shared memory and/or one or more others of the local memories of others of the plurality of parallel processors, a plurality of channel interface circuits, each being disposed in a respective one of the processor core units, and each operable to facilitate data transfers into and out of a respective one of the local memories from and to others of the plurality of parallel processors over a respective second data transfer path;

a plurality of synchronization queues, each being disposed in a respective one of the processor core units, each having a respective synchronization flag for each initiated data transfer into a respective one of the local memories;

a plurality of storage circuits, each being disposed in a respective one of the processor core units and operatively coupled to a respective one of the plurality of synchronization queues; and a managing processor operatively coupled to the shared memory and the plurality of parallel processors, and operating to issue a first recover synchronization request directly or indirectly to a first one of the memory interface circuits of a first one of the plurality of parallel processors in response to a data transfer initiating device sending a write data notification to the managing processor indicating a first data transfer into a first one of the local memories over the respective first data transfer path of the first one of the plurality of parallel processors;

wherein the first memory interface circuit is operable to:

copy a first value of the respective synchronization flag, associated with the first data transfer, into a first of the storage circuits of the first one of the plurality of parallel processors in response to the first recover synchronization request, change the first value within the first storage circuit in response to completion of the first data transfer into the first local memory, and produce a first synchronization signal when the first value indicates that the first data transfer into the first local memory has been completed, the first synchronization signal indicating that a data transfer from the first local memory of the first of the plurality of processors over the second data transfer path using the channel interface circuit would result in valid data being read.

47. The apparatus of claim 46, wherein:

the first recover synchronization request is issued by the managing processor by writing a synchronization instruction to a special register such that a value therein indicates that the first synchronization request has been made.

48. The apparatus of claim 47, wherein:

the first memory interface circuit is operable to at least initiate the production of the first synchronization signal by monitoring when the first data transfer into the first local memory has been completed; and the first memory interface circuit is operable to produce the first synchronization signal by writing into the special register such that a processor readable value therein indicates that the first data transfer into the first local memory has been completed.

49. The apparatus of claim 48, wherein at least one of:

the managing processor operates to receive the first synchronization signal by reading the value in the special register written by the first memory interface circuit;

the managing processor operates to initiate a transfer of data out of the first local memory after the first data transfer has been completed by issuing an instruction to the first channel interface circuit; and the first processor issues a DMA transfer from the first local memory to the shared memory in response to the instruction from the managing processor to the first channel interface circuit.

* * * * *

UNITED STATES PATENT AND TRADEMARK OFFICE
CERTIFICATE OF CORRECTION

| | | |
|---|---|---|
| PATENT NO. | : 7,613,886 B2 | Page 1 of 1 |
| APPLICATION NO. | : 11/053689 | |
| DATED | : November 3, 2009 | |
| INVENTOR(S) | : Takeshi Yamazaki | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 254 days.

Signed and Sealed this

Nineteenth Day of October, 2010

David J. Kappos
*Director of the United States Patent and Trademark Office*